(12) United States Patent
Milousheff et al.

(10) Patent No.: US 8,812,539 B2
(45) Date of Patent: Aug. 19, 2014

(54) UNIQUE ATTRIBUTE CONSTRAINTS FOR VERSIONED DATABASE OBJECTS

(75) Inventors: Zack Milousheff, Boxford, MA (US); Mark Hutchins, Millbury, MA (US)

(73) Assignee: BMC Software, Inc., Houston, TX (US)

( * ) Notice: Subject to any disclaimer, the term of this patent is extended or adjusted under 35 U.S.C. 154(b) by 107 days.

(21) Appl. No.: 13/453,628

(22) Filed: Apr. 23, 2012

(65) Prior Publication Data

US 2013/0262403 A1    Oct. 3, 2013

Related U.S. Application Data

(60) Provisional application No. 61/618,771, filed on Mar. 31, 2012.

(51) Int. Cl.
*G06F 17/30* (2006.01)

(52) U.S. Cl.
USPC .......................................................... 707/769

(58) Field of Classification Search
None
See application file for complete search history.

(56) References Cited

U.S. PATENT DOCUMENTS

| | | | | |
|---|---|---|---|---|
| 6,460,052 | B1 * | 10/2002 | Thomas et al. ................ | 707/695 |
| 7,457,817 | B2 * | 11/2008 | Krishnaswamy et al. ............ | 1/1 |
| 7,650,360 | B2 * | 1/2010 | Bailey et al. .................. | 707/704 |
| 2007/0043783 | A1 * | 2/2007 | Idicula et al. ................. | 707/201 |

OTHER PUBLICATIONS

"FIFO Support", XAP 7.0.X Documentation, GigaSpaces Documentation Wiki, retrieved on Jul. 26, 2012, pp. 1-2. Available at: http://www.gigaspaces.com/wiki/display/XAP7/FIFO+Support.
"Map Pessimistic Locking", XAP 6.0 Documentation, GigaSpaces Documentation Wiki, retrieved on Jul. 26, 2012, pp. 1-3. Available at: http://www.gigaspaces.com/wiki/display/GS6/Map+Pessimistic+Locking.
"Space Locking and Blocking", GigaSpaces Platform 5.X Documentation, GigaSpaces Documentation Wiki, retrieved on Jul. 26, 2012, pp. 1-4. Available at: http://www.gigaspaces.com/wiki/display/GS/Space+Locking+and+Blocking.

* cited by examiner

*Primary Examiner* — Rehana Perveen
*Assistant Examiner* — Hung Havan
(74) *Attorney, Agent, or Firm* — Brake Hughes Bellermann LLP

(57) ABSTRACT

Methods and apparatus for ensuring uniqueness of database object attributes are disclosed. An example computer-implemented method includes receiving a request to insert, update or delete a versioned database object having a first identifier (ID) in a main database table. The method further includes determining, based on the request, whether to fire an insert trigger, a delete trigger or an update trigger for the main database table. In the event an insert trigger is fired, the method includes performing, in a secondary database table, a record insertion process. In the event a delete trigger is fired, the method includes performing, in the secondary database table, a record deletion process. In the event an update trigger is fired, the method includes performing, in the secondary database table, at least one of the record insertion process for a post-update versioned database object and the record deletion process for a pre-update versioned database object.

25 Claims, 7 Drawing Sheets

UNIQUE ATTRIBUTE CONSTRAINTS FOR VERSIONED DATABASE OBJECTS

CROSS-REFERENCE TO RELATED APPLICATIONS

This application claims the benefit under 35 U.S.C. §119 (e) of U.S. Provisional Patent Application Ser. No. 61/618, 771, filed on Mar. 31, 2012. The disclosure of U.S. Provisional Application Ser. No. 61/618,771 is incorporated by reference herein in its entirety.

TECHNICAL FIELD

The subject matter of the present disclosure relates, generally, to approaches for ensuring uniqueness of database object attributes across different database objects, such as for different versioned database objects.

BACKGROUND

A database, such as a relational database, is an organized collection of data. Such databases commonly organize a given collection of data into objects that may be expressed using, e.g., tables, indexes, columns, and rows. Each object in a database, such as a relational database, may be identified using an identifier that is one attribute of, and unique to a given object. Such identifiers may be referred to, for example, as object identifiers (IDs), record IDs, unique IDs or simply IDs. In certain situations, it is desirable to retain different versions of an object with a given (unique) ID. For instance, retaining different versions of database objects may be desirable in order to keep track of historical information that is included in different versions of each given object.

As an example, a relational database may be used to maintain personnel records for a company, where information for each employee of the company may be included in different versions of a database object that each have (share) a respective unique ID, where each unique object ID corresponds with a respective employee. In such an implementation, each piece of information in the different versions of a given employee's database object (or record) may be referred to as an attribute of that record (object). Thus, the different versions of a given employee's database record (object) may be used to keep track of historical information for that employee, such as changes in compensation, changes in work assignment, etc. Of course, such an implementation is given by way of example and many other situations and implementations are possible.

In approaches that implement database objects that have different versions (with the same ID) persisted in a database, it also often desirable that at least a subset of an object's attributes be unique (unique attributes) across different versioned database objects, such as objects with different unique IDs (e.g., database objects for different employees), but not for different versions of the same object (e.g., different versions of a database object for a specific employee). In such situations, a comparison of a subset of unique attributes between different versioned database objects in a given database should indicate that each of those unique attributes is not repeated for objects with different IDs.

Such approaches allow the same set of attributes to be shared by different versions of an object having the same ID. Thus, from a DB perspective, when persisting (storing) different versions of a given object (with the same ID) within a relational DB table (along with other versioned database objects, e.g., of the same type, such as employee records, with different IDs), such unique constraints may not be enforced for different versions of an object with the same unique ID and, thus, those attributes can be repeated by different versions of the same object. For example, each employee may be assigned an employee number that is required to be unique for each employee record (with different IDs). However, the employee number of a given employee may be repeated in different versions of that employee's record (database object) in the relational database (with the same ID).

A common situation in databases that store (persist) such versioned database objects, may occur when two different threads (e.g., from an application layer or separate application layers) try to create new versions of different versioned database objects (with different IDs) at the same time. In an example, it is assumed that a NAME attribute of each versioned database object in a given database should be unique across different objects, while the value of the NAME attribute may be the same for different versions of the same object. In this example, it is also assumed that both of the threads are trying to insert different versioned database objects (e.g., representing respective servers in a computing network with different IDs) with a NAME attribute of "Elvis" at substantially the same time.

In this situation, in current implementations, each thread would first read a database table that is used to persist such versioned database objects and, as a result, each thread could determine that there is no committed record with a NAME attribute of "Elvis", e.g., if no such record had been created before the two threads attempt to create their associated records. In this situation, after reading the database table, both threads would insert their respective new records that violate the uniqueness of the NAME attribute, as a result of two different versioned database objects (with different IDs) with a name attribute of "Elvis" being created.

In certain situations, it may be desirable not only that unique attributes of records stored in a relational database be unique across different versioned database objects (with different IDs), but also that the unique attributes of different versions of the same object remain unchanged (are immutable across versions), though other attributes (not requiring uniqueness) may change across versions. In such situations, the unique attributes that are to remain unchanged across different versions of the same object may be considered to operate as an additional (or extended) unique ID for their respective object.

In order to enforce such uniqueness constraints, current approaches use techniques where an entire database table is locked when any thread attempts to insert, update or delete a record (object) in the table, and each such thread is handled in a serial (e.g., first-in-first-out) fashion. However, such approaches have undesirable outcomes, as locking an entire database table severely reduces concurrent (parallel) data access and increases operation latency (due to serial processing). Accordingly, such approaches severely limit performance of applications and/or databases in which versioned database objects and uniqueness constraints are implemented.

SUMMARY

In one general aspect, a computer-implemented method includes receiving a request to insert, in a main database table, a versioned database object having a first identifier (ID). The method further includes determining whether uniqueness of a first subset of attributes of the versioned database object versus other versioned database objects in the main database table having different IDs than the first ID is required. In the event it is determined that uniqueness of the first subset of attributes is required, the method further includes evaluating uniqueness of the first subset of attributes of the versioned database object with the first ID as compared to the other versioned database objects based on respective records for the other versioned database objects stored in a secondary database table.

Implementations can include one or more of the following features. For example, if, based on the evaluating, it is determined that the first subset of attributes is not unique, the method may include aborting the insertion of the versioned database object with the first ID and raising an exception to an application layer. If, based on the evaluating, it is determined that the first subset of attributes is unique, the method may include updating or inserting a record corresponding with the versioned database object with the first ID in the secondary database table and completing the insertion of the versioned database object with the first ID in the main database table.

Updating or inserting a record corresponding with the versioned database object with the first ID in the secondary database table may include, in the event a previously inserted record that includes the first ID and the first subset of attributes is present in the secondary database table, incrementing a record count of the previously inserted record. In the event a previously inserted record with the first ID and the first subset of attributes is not present in the secondary database table, the method may include inserting a new record in the secondary database table that includes the first ID and the first subset of attributes. The method may include setting a record count of the new record to one.

Determining whether uniqueness of the first subset of attributes is to be evaluated may be based on a second subset of attributes of the versioned database object with the first ID. Determining whether uniqueness of the first subset of attributes is required may include evaluating a Boolean expression based on a second subset of attributes of the versioned database object with the first ID.

Evaluating uniqueness of the first subset of attributes of the versioned database object with the first ID may include evaluating uniqueness of the first ID in the secondary database table.

In another general aspect, a computer-implemented method includes receiving a request to delete, from a main database table, a versioned database object having a first ID. The method further includes determining whether uniqueness of a first subset of attributes of the versioned database object versus other versioned database objects in the main database table having different IDs than the first ID is required. The method still further includes, in the event it is determined that uniqueness of the first subset of attributes is required, updating or deleting a record corresponding with the versioned database object with the first ID in a secondary database table.

Implementations can include one or more of the following features. For example, determining whether uniqueness of the first subset of attributes of the versioned database object is required may include evaluating a Boolean expression based on a second subset of attributes of the versioned database object with the first ID. Updating or deleting a record corresponding with the versioned database object with the first ID in the secondary database table may include decrementing a record count of a previously inserted record in the secondary database table that includes the first ID and the first subset of attributes and, in the event the decremented record count is zero, deleting the previously inserted record from the secondary database table. The method may include deleting the versioned database object with the first ID from the main database table.

In another general aspect, a computer-implemented method includes receiving a request to update, in a main database table, a versioned database object having a first ID from a pre-update versioned database object to a post-update versioned database object. The method further includes determining whether to fire an update trigger for the main database table based on uniqueness requirements for respective, analogous first subsets of attributes of the pre-update versioned database object and the post-update versioned database object. In the event that a determination to fire the update trigger is made, the method includes performing, in a secondary database table, at least one of a delete process for a record corresponding with the pre-update versioned database object and an insert process for a record corresponding with the post-update versioned database object.

Implementations can include one or more of the following features. For example, determining whether to fire the update trigger may include evaluating one or more Boolean expressions based on respective, analogous second subsets of attributes of the post-update versioned database object and the pre-update versioned database object.

Evaluating the one or more Boolean expressions may include determining that uniqueness of the first subset of attributes for the post-update versioned database object is not to be evaluated and determining that uniqueness of the first set of attributes for the pre-update versioned database object was evaluated. In response, the method may include performing the delete process. The delete process may include decrementing a record count of a previously inserted record in the secondary database table that includes the first ID and the first subset of attributes of the pre-update versioned database object and, in the event the decremented record count is zero, deleting the previously inserted record from the secondary database table.

Evaluating the one or more Boolean expressions may include determining that uniqueness of the first subset of attributes for the post-update versioned database object is to be evaluated, uniqueness of the first subset of attributes for the pre-update versioned database object was evaluated and the first subset of attributes of the post-update versioned database object is different than the first subset of attributes of the pre-update versioned database object. In response, the method may include performing the delete process and the insert process.

The delete process may include decrementing a record count of a previously inserted record in the secondary database table that includes the first ID and the first subset of attributes of the pre-update versioned database object and, in the event the decremented record count is zero, deleting the previously inserted record from the secondary database table.

The insert process may include evaluating uniqueness of the first set of attributes of the post-update versioned database object as compared to other versioned database objects in the main database table having respective IDs that are different than the first ID, the evaluating being based on respective records for the other versioned database objects stored in the secondary database table. In the event it is determined that the first set of attributes of the post-update versioned database object is not unique, the insert process may include aborting the update and raising an exception in an application layer. In the event it is determined that the first set of attributes of the post-update versioned database object is unique, the insert process may include updating or inserting a record corresponding with the post-update versioned database object in the secondary database table and completing the update of the versioned database object with the first ID in the main database table.

Evaluating uniqueness of the first subset of attributes of the post-update versioned database object may include evaluating uniqueness of the first ID in the secondary database table.

Updating or inserting a record in the secondary database table corresponding with the post-update versioned database object may include, in the event a previously inserted record that includes the first ID and the first subset of attributes of the post-update version of the versioned database object is present in the secondary database table, incrementing a record count of the previously inserted record. In the event a previously inserted record with the first ID and the first subset of attributes is of the post-update versioned database object is not present in the secondary database table, updating or inserting a record may include inserting a new record in the secondary database table that includes the first ID and the first subset of attributes of the post-update versioned database object. The method may further include setting a record count of the new record to one.

Evaluating the one or more Boolean expressions may include determining that uniqueness of the first subset of attributes for the post-update versioned database object is to be evaluated and uniqueness of the first subset of attributes for the pre-update versioned database object was not evaluated. In response, the method may include performing an insert process including evaluating uniqueness of the first set of attributes of the post-update versioned database object as compared to other versioned database objects in the main database table having respective IDs that are different than the first ID, the evaluating being based on respective records for the other versioned database objects stored in the secondary database table In the event it is determined that the first set of attributes of the post-update versioned database object is not unique, the insert process may include, aborting the update and raising an exception in an application layer. In the event it is determined that the first set of attributes of the post-update versioned database object is unique, the insert process may include updating or inserting a record corresponding with the post-update versioned database object in the secondary database table and completing the update of the versioned database object with the first ID in the main database table.

Evaluating uniqueness of the first subset of attributes of the post-update versioned database object may include evaluating uniqueness of the first ID in the secondary database table.

Updating or inserting a record in the secondary database table corresponding with the post-update versioned database object may include, in the event a previously inserted record that includes the first ID and the first subset of attributes of the post-update version of the versioned database object is present in the secondary database table, incrementing a record count of the previously inserted record. In the event a previously inserted record with the first ID and the first subset of attributes is of the post-update versioned database object is not present in the secondary database table, updating or inserting a record in the secondary database table may include inserting a new record in the secondary database table that includes the first ID and the first subset of attributes of the post-update versioned database object. The method may further include setting a record count of the new record to one.

In another general aspect, a computer-implemented method includes receiving a request to insert, update or delete a versioned database object having a first identifier (ID) in a main database table. The method further includes determining, based on the request, whether to fire an insert trigger, a delete trigger or an update trigger for the main database table. In the event an insert trigger is fired, the method includes performing, in a secondary database table, a record insertion process for the versioned database object. In the event a delete trigger is fired, the method includes performing, in the secondary database table, a record deletion process for the versioned database object. In the event an update trigger is fired, the method includes performing, in the secondary database table, at least one of the record insertion process for a post-update versioned database object and the record deletion process for a pre-update versioned database object.

In another general aspect, a non-transitory, computer-readable storage device or medium has instructions stored thereon that, when executed, cause a processor and/or a computing device to perform a process. The instructions include instructions to receive a request to insert, update or delete a versioned database object having a first identifier (ID) in a main database table and determine, based on the request, whether to fire an insert trigger, a delete trigger or an update trigger for the main database table. In the event an insert trigger is fired, the instructions include instructions to perform, in a secondary database table, a record insertion process for the versioned database object. In the event a delete trigger is fired, the instructions include instructions to perform, in the secondary database table, a record deletion process for the versioned database object. In the event an update trigger is fired, the instructions include instructions to perform, in the secondary database table, at least one of the record insertion process for a post-update versioned database object and the record deletion process for a pre-update versioned database object.

DETAILED DESCRIPTION

Figure 1:
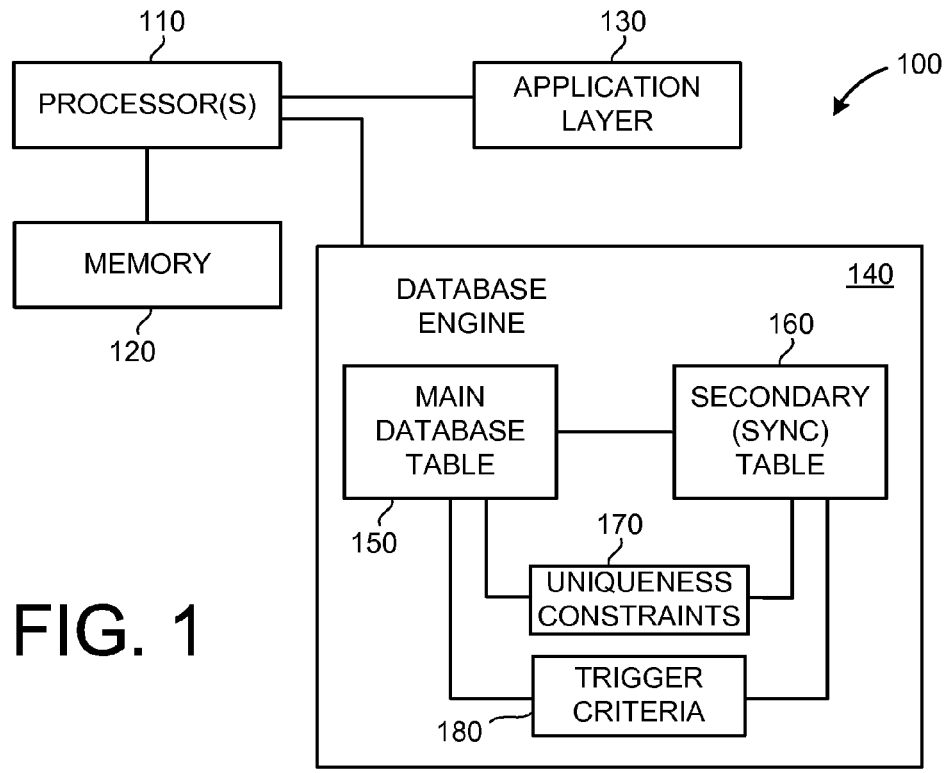
FIG. 1 is a block diagram illustrating a system for ensuring uniqueness of versioned database object attributes according to an example implementation.

FIG. 1 is a block diagram illustrating a system 100 that may be used to ensure uniqueness of attributes of versioned database objects according to an example implementation. The system 100 may be used, for example, to implement the techniques for enforcing uniqueness constraints for attributes of versioned database objects that are described herein. It will be appreciated, however, that the system 100 may be used to implement other techniques for enforcing such uniqueness constraints. It will also be appreciated that the techniques for enforcing uniqueness constraints for attributes of versioned database objects that are described herein may be implemented in systems, or in apparatuses having other configurations.

As shown in FIG. 1, the system 100 includes one or more processors 110 and memory 120. In the system 100, the processor(s) 110 (hereafter processors 110) may be, for example, microprocessors. The memory 120 may include non-volatile memory, such as a hard disk drive, a solid state drive, an optical drive, and/or some other form of non-volatile memory. The memory 120 may also include volatile memory, such as random access memory. (RAM). The memory 120 may be used to store machine-readable instructions that, when executed by the processors 110, cause the system 110 to implement approaches for enforcing uniqueness constraints for attributes of versioned database objects, such as using the techniques described herein.

As shown in FIG. 1, in the system 100, instructions stored in the memory 120, when executed by the processors 110, may implement an application layer 130 and a database engine 140. In the system 100, the application layer 130 may be operably coupled (e.g., may operably communicate) with the database engine 140. For instance, in an example implementation, the application layer 130 may include a data network management application that may be used to design and/or maintain a data network. In such an implementation, information regarding elements of a given data network (e.g., servers, switches, etc.) may be stored as database objects in the database engine 140, such as in a main database table 150.

In such an approach, the application layer 130 may operable communicate with the database engine 140 to add, delete and/or update database records for elements of a given data network. For example, the database records for each element of the given data network may be stored in the main database table 150, or in a plurality main database tables, where database records for each different type of network element are stored in respective, separate database tables. For instance, respective database records for each server in a given data network may be stored in a first main database table, while respective database records for each switch in a given data network may be stored in a second main database table, etc. Of course, other arrangements are possible. For purposes of clarity and brevity, only a single main database table 150 is shown in FIG. 1. It will be understood, however, depending on the particular implementation (e.g., the particular application layer 130 with which the database engine 140 is operating), that multiple main database tables 150 may be included in the database engine 140, e.g., one main database table 150 for each different type of database record that is maintained by the database engine 140.

In some implementations, the system 100 may also include multiple (e.g., substantially similar) application layers 130 that are each in operable communication with the database engine 140. In such approaches, the multiple application layers 130 may be configured to concurrently access the database engine 140 in order to insert, delete and/or update versioned database objects in the main database table 150 (e.g., or in multiple main database tables 150).

As is further illustrated in FIG. 1, the database engine 140 also includes a secondary (sync, or synchronization) table 160 that corresponds with the main database table 150. In an example implementation, the secondary database table 160 may be used by the database engine 140 to enforce uniqueness constraints for attributes of versioned database objects that are stored in the main database table 150. In implementations that include multiple main database tables 150, the database engine 140 may include respective, corresponding secondary database tables 160 for each main database table 150, where each secondary database table 160 is used to enforce uniqueness constraints for attributes of versioned database objects stored in its respective main database table 150, such as using the approaches described herein. Briefly, such approaches allow for enforcement of uniqueness constraints without the need to lock the entire main database table 150, thus allowing for highly concurrent access to the database engine 140 by the application layer 130 (or multiple application layers 130).

In the system 100, the database engine 140 also includes uniqueness constraints 170 and trigger criteria 180. In an example implementation, the uniqueness constraints 170 may define which attributes (e.g., respective, analogous first subsets of attributes) of versioned database objects stored in the main database table 150 should be unique as compared to analogous attributes of other versioned database objects (e.g., with different identifiers) in the main database table 150. Also, by enforcing a uniqueness constraint (in the uniqueness constraints 170) for a given database object's unique identifier (ID) in the secondary database table 160, the approaches described herein may also be used to enforce immutability requirements for unique attributes of a corresponding versioned database object in the main database table 150.

The trigger criteria 180 may define when the uniqueness constraints 170 should be enforced for a given versioned database object. For instance, the trigger criteria 180 may be represented by one or more Boolean expressions that are evaluated based on attributes of the versioned database objects, such as respective, analogous second subsets of attributes of versioned database objects that the application layer 130 requests the database engine 140 to insert, delete or update in the main database table 150.

Figure 2:
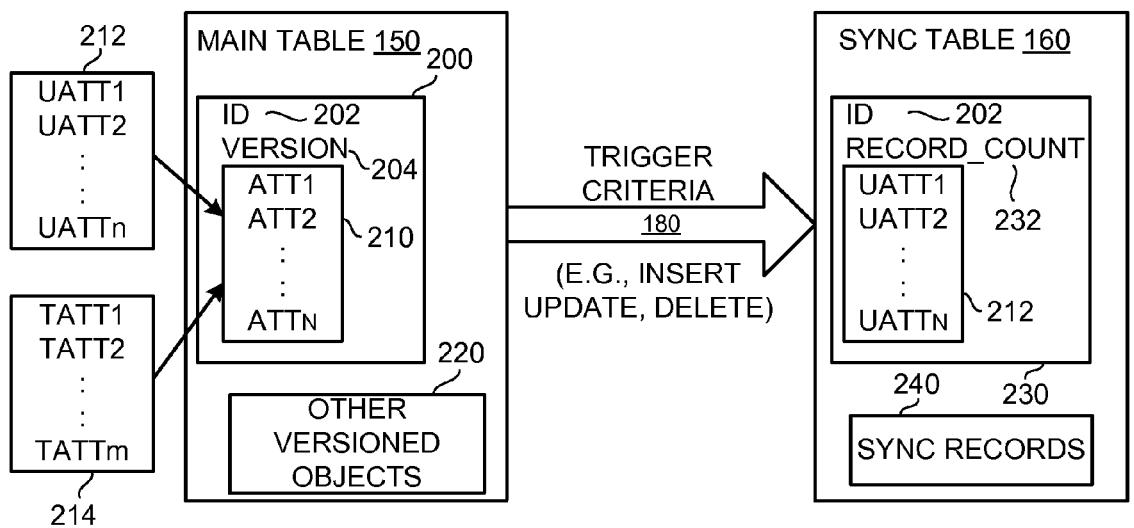
FIG. 2 is a diagram illustrating a generic main database table and a corresponding secondary (sync) database table according to an example implementation.

FIG. 2 is a diagram illustrating a main database table 150 and a corresponding secondary database (sync) table 160 according to an example implementation. The main database table 150 and the secondary database table 160 in FIG. 2 are illustrated in non-specific form, for purposes of illustration. Such database tables may be used in the system 100 shown in FIG. 1. Accordingly, for purposes of this disclosure, the main database tables 150 and the secondary database tables 160 shown in FIGS. 1 and 2 are referenced with the same reference numbers. It will be appreciated that the main database table 150 and the secondary database table 160 shown in FIG. 2 may, in like fashion as discussed above with respect to FIG. 1, be one set of a number of sets of corresponding main database tables and secondary database tables that are included in a database engine, such as in the database engine 140 shown in FIG. 1 and that those tables may be concurrently accessed (directly or indirectly) by one or more application layers 130.

In a database, such as a relational database (DB), an attribute set of a versioned database object may be represented by the versioned database object 200 shown in FIG. 2, where such database objects may be stored in the main database table 150. As shown in FIG. 2, the versioned database object 200 may include a unique ID 202, a version number (version) 204 and a set of attributes 210 (ATT1, ATT2 . . . ATTN) that make up, for example, data elements of the versioned database object 200.

The attributes 210 of the versioned database object 200 may include a first subset of the attributes 210, shown in FIG. 2 as unique attributes 212 (UATT1, UATT2 ... UATTn) for which uniqueness constraints may be enforced, such as using the approaches described herein. The specific number of unique attributes 212 for the versioned database object 200 will depend on the particular embodiment, and could be a single unique attribute or multiple unique attributes. In example implementations, uniqueness constraints for the unique attributes 212 may be enforced using the sync table 160, such as in the manners described herein.

As is also shown in FIG. 2, the attributes 210 of the versioned database object 200 may include a second subset of the attributes 210, e.g., (TATT1, TATT2 ... TATTn), or trigger attributes 214, which may be used to evaluate whether to "fire" row level database triggers when inserting, deleting or updating the versioned database object 200 in the main database table 150. Examples of implementing such triggers to enforce uniqueness constraints are described in further detail below. Briefly, however, the trigger attributes 214 of a given versioned database object 200 may be used to evaluate one or more Boolean expressions in order to determine whether uniqueness constraints for the unique attributes 212 are to be enforced for the given versioned database object 200.

For instance, if an attempt is made to insert, delete or update the object 200 in the main table 150, the trigger attributes 214 of the object 200 may be used to evaluate a given Boolean expression or expression (e.g., which may be included in the trigger conditions 180) to determine whether to enforce uniqueness constraints as part of the insert, delete or update operation. In the case of an update operation, a given Boolean expression (trigger condition 180) may be evaluated for the trigger attributes 214 of the database object 200 before the update (for the pre-update object) and after the update (for the post-update object), to determine what, if any actions to take to enforce uniqueness constraints in connection with the update operation. As is described further below, evaluating an update trigger, in some situations, may also be based on the unique attributes 212 of a pre-update versioned database object 200 and a post-update versioned database object 200. Also, as with the unique attributes 212, the specific number of trigger attributes 214 for a given versioned database object 200 will depend on the particular embodiment and the exact trigger conditions 180 that are specified. Depending on the particular implementation, there could be a single trigger attribute or multiple trigger attributes.

The main table 150, as shown in FIG. 2, also includes other versioned database objects 220, which may include different versions of the object 200 (i.e., objects with the same ID 202 but different version numbers 204). The other versioned database objects 220 may also include other versioned database objects (i.e., versioned database objects with different IDs than the object 200) against which uniqueness constraints for the versioned database object 200 (or other still other versioned database objects) may be enforced. As discussed above, each versioned database object in the main table 150 may represent a specific type of entity, such as respective network data servers, as one example. In such implementations, each database record in the main table 150, as they represent respective like entities, may be of similar construction as the object 200, for example. For purposes of clarity and illustration, enforcement of uniqueness attributes is described herein as being applied for versioned database objects 200 of like construction (i.e., that include analogous sets of attributes 210, and corresponding analogous subsets of unique attributes 212 and trigger attributes 214).

In the arrangement shown in FIG. 2, with further reference to FIG. 1, the application layer 130 may issue a request to the database engine 140 to insert, delete or update the versioned database object 200 in the main database table 150. In response to such requests, the database engine 140 may evaluate the trigger criteria 180 for the specific operation that is requested, in order to determine whether uniqueness constraints should be enforced in connection with the requested operation. In order to enforce such uniqueness constraints, depending on the particular operation requested, the database engine 140 may perform a number of operations on the main table 150 and the sync table 160 to enforce uniqueness constraints and to carry out, or abort the requested operation, as appropriate, based on the evaluation of the uniqueness constraints. While example insert, delete and update operations are discussed further below, for purposes of illustration, example implementations of each of these operations is now also discussed with respect to FIG. 2, and with further reference to FIG. 1.

For instance, if the application layer 130 sends a request to the database engine 140 to insert the object 200 in the main table 150, the database engine 140 may perform the following operations to process that insert request. Initially, the database engine 140 may write the elements of the versioned database object 200 in a temporary row of the main table 150 (or elsewhere in the database engine 140, such as a temporary memory structure) and lock that row, without locking the entire main table 150. Such an approach allows concurrent access to continue while the insert operation is processed.

The database engine 140 may then evaluate trigger conditions 180 (e.g., evaluate a Boolean expression) based on the trigger attributes 214 of the object 200. If it is determined, based on the trigger conditions 180, that uniqueness constraints are not to be enforced for the requested insert operation, in this example, an insert trigger would not fire and the temporary row may be converted to a committed row in the main table 150. The database engine 140 may then notify the application layer 130 that the requested insert operation was successfully completed. In this situation, no information regarding the object 200 may be moved to the sync table 160, because uniqueness constraints are not being enforced and, therefore, the object 200 would not need to have a corresponding sync record 230 or 240 in the sync table 160. It is noted that the sync record 230 shown in FIG. 2 is shown for the purposes of illustrating other operations and may not be present in the situation just described.

In the above example, if it is determined, based on the trigger conditions 180, that uniqueness constraints are to be enforced for the requested insert operation, an insert trigger may fire. The database engine 140 may then compare the unique attributes of the object 200 with analogous unique attributes for each versioned database objects in the other versioned objects 220 that have different IDs than the object 200 for which uniqueness constraints are being enforced (e.g., without copying any information to the sync table 160). In this implementation, that comparison of the unique attributes 212 is made against analogous unique attributes of the sync records 240 stored in the sync table 160. In such an approach, each of the sync records 240 may contain a sync record (such as in the form of sync record 230) that correspond with each versioned database object in the main table 150 for which uniqueness attributes are to be enforced.

If the comparison of the unique attributes 212 with the sync records 240 indicates that the unique attributes 212 violate uniqueness constraints (e.g., are not unique across versioned objects with different IDs), the database engine 140 may abort the insert operation, remove the temporary row from the main table 150 and raise an exception to the application layer 130, indicating that the insert request failed. However, if the comparison of the unique attributes 212 with the sync records 240 indicates that the unique attributes 212 of the object 200 do not violate uniqueness constraints (e.g., are unique across versioned objects with different IDs), the database engine 140 may then insert the sync record 230 in the sync table 160, where the sync record 230 includes the ID 202, a record_count 232 (e.g., where the record-count 232 is set to one if the sync record 230 is new).

Alternatively, if a sync record 230 already exists with the same ID and the same subset of unique attributes 212 (e.g., each of the unique attributes have the same respective values), the database engine 140 may increment (by 1) a record_count 232 of the previously created sync record 230, so as to indicate a new version of the object 200 being inserted in the main table 150 with a set of unique attributes 212 that match the unique attributes of a previously inserted object with the same ID. In this situation, the database engine 140 may then convert the temporary row to a committed row in the main table 150 and notify the application layer 130 that the insertion request has completed successfully.

In the event the application layer 130 sends a delete request for the versioned database object 200 to the database engine 140, the database engine 140 may perform the following process to respond to the delete request. Initially, the database engine 140 may evaluate the trigger conditions 180 for the object 200, in order to determine if uniqueness constraints are being enforced for the database record 200. If, based on the evaluation of the trigger conditions 180, it is determined that uniqueness constraints are not being enforced for the object 200, the database engine 140 may remove object 200 from the main table 150 and notify the application layer 130 that the delete request has been completed.

However, if it is determined, based on evaluation of the trigger conditions 180, that uniqueness constraints are being enforced for the object 200 that is being deleted, the database engine 140 may locate a corresponding sync record 230 in the sync table 160 (e.g., with the same ID 202 and matching unique attributes 212). The database engine 140 may then decrement (by 1) the record_count 232 of the sync object 230. The database engine 140 may then remove the object 200 from the main table 150 and notify the application layer 130 that the delete request has been completed. Further, if the record_count 232 of the sync object 230, after being decremented, is zero, the database engine 140 may also remove the sync record 230 from the sync table 160, thus indicating that all versioned database objects with the ID 202 and the specific set of unique attributes 212 have been deleted from the main table 150 and, therefore, no longer are relevant for enforcing uniqueness constraints across versioned database objects in the main table 150.

In the event the application layer 130 sends an update request for the versioned database object 200 to the database engine 140, the database engine 140, in an example implementation, may perform the following process to respond to the update request. Initially, the database engine 140 may evaluate the trigger conditions 180 for the object 200 before the update (for a pre-update object) and after the update (for a post-update object), in order to determine if an update trigger should be fired and also determine what operations to perform in the sync table 160 and the main table 150 in order to correctly enforce uniqueness constraints in the main table 150.

If, based on evaluating the trigger conditions 180 for the update request, an update trigger is fired, the database engine 140 may perform one or both of a delete process for the pre-update object and/or an insert process for the post-update object, such as in similar fashions as described above and are descried further below. For instance, FIG. 10, which is described below, illustrates an example method that may be implemented to evaluate update request trigger conditions and to determine what operations to perform in response to a given update request. Of course, other approaches are possible. For instance, an update trigger may be fired by the database engine 140 for every update request that is received from the application layer 130 and separate trigger conditions 180 may be evaluated to determine which, if any, operations to perform in response to a given update trigger.

Figure 3:
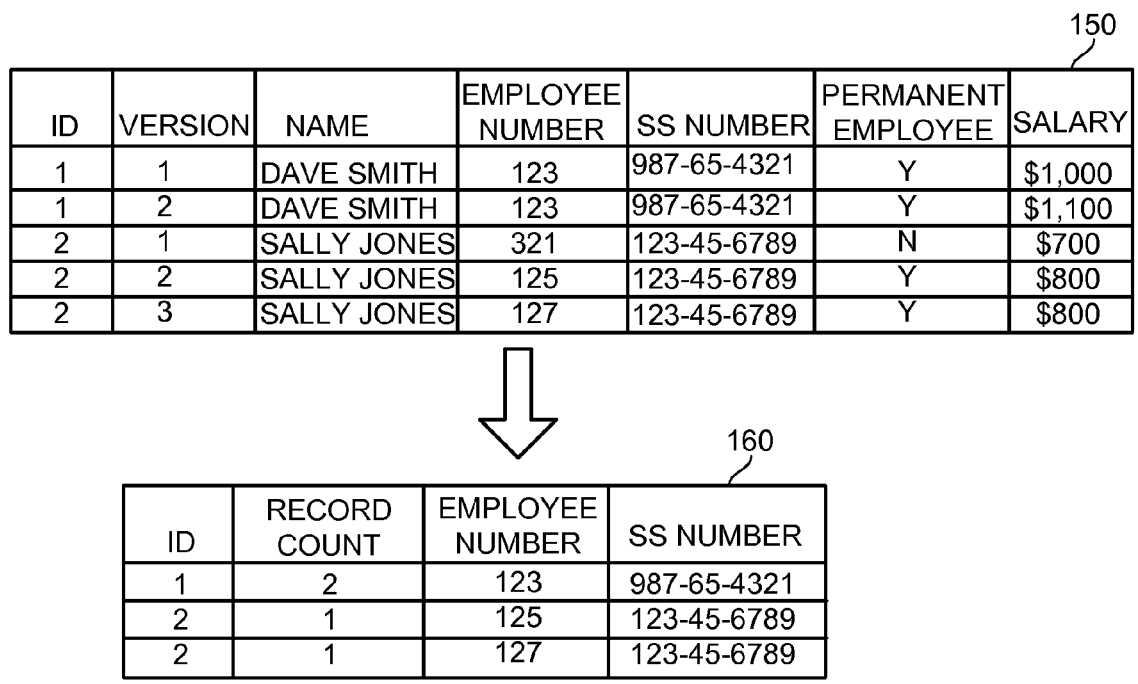
FIG. 3 is a diagram illustrating a main database table and a secondary (sync) database table according to an example implementation.

FIG. 3 is a diagram illustrating a main database table 150 and a secondary (sync) database table 160 according to an example implementation. The main database table 150 and the secondary database table 160 in FIG. 3 illustrate example tables that may be used to enforce uniqueness attributes for versioned database objects that are used for employee records, where each row of the main table 150 corresponds with a respective versioned database object and each row of the sync table 160 corresponds with a sync record that is associated with one or more of the versioned database objects stored in the main table 150 of FIG. 3. Such database tables may be used in the system 100 shown in FIG. 1 and could be represented using the structure of the tables shown in FIG. 2. Accordingly, for purposes of this disclosure, the main database table 150 and the secondary database table 160 shown in FIG. 3 are referenced with the same reference numbers as the main tables and sync tables shown in FIGS. 1 and 2. It will be appreciated that the main database table 150 and the secondary database table 160 shown in FIG. 3 may, in like fashion as discussed above with respect to FIGS. 1 and 2, be one set of a number of sets of corresponding main database tables and secondary database tables that are included in a database engine, such as in the database engine 140 shown in FIG. 1, and that those tables may be concurrently accessed (directly or indirectly) by one or more application layers 130.

In the example implementation shown in FIG. 3, the sync table 160 may be used in conjunction with the main table 150 to enforce uniqueness constraints for the "Employee Number" and "Social Security (SS) number" attributes of each versioned database object. In like fashion as discussed above, in certain embodiments, the values of unique attributes of the versioned database objects in the main table 150 may be repeated for different versions of the same object (with the same ID), but may not be repeated across objects with different IDs. Also in the example implementation shown in FIG. 3, determining whether to enforce uniqueness constraints for a given database may be based on a Boolean expression that is evaluated based on the "Permanent Employee" attribute of each versioned database object (e.g., each versioned database object (employee record) that is being updated, delete or inserted). Accordingly, in this example, the "Permanent Employee" attribute is a trigger attribute. In other embodiments, other database object attributes may be included, additional unique attributes may be enforced and additional trigger attributes may be used when determining whether to fire row level (e.g., insert, delete or update) triggers in response to requests to perform database operations, e.g., by an application layer.

As shown in the main table 150 of FIG. 3, there are two versions of the versioned database object with ID="1", for an employee Dave Smith. In both of these versioned objects, Dave Smith is associated with an employee number of "123" and a SS Number of "987-65-4321." As may also be seen in the main table 150, both of the versioned objects with an ID="1" for Dave Smith indicate that he is a permanent employee, with the only change between records, other than the version number, is the "Salary" attribute.

Using the techniques described herein, when inserting each of these records in the main table 150, an insert trigger would be fired because the trigger condition of "Permanent Employee"="Y" is met. Uniqueness of the "Employee Number" and "SS Number" attributes would be evaluated, respectively, for each insertion request and, once uniqueness is confirmed, the first sync record in the sync table 160 would be created with a "Record Count" of "1", e.g., when version "1" is entered in the main table 150, and the record count would be updated to "2", e.g., when version "2" of the object is entered in the main table 150. In this implementation, a second sync record would not be created when version "2" of Dave's Smith's record is inserted, because the unique attributes for both versions are the same and, instead, the "Record Count" attribute of the first sync record (for Dave Smith) in the sync table 160 would be incremented to indicate that two versions of a record with the same ID and the same unique attributes are present in the main table 150.

As is also shown in the main table 150 of FIG. 3, there are three versions of the versioned database object with ID="2", for an employee Sally Jones. In version "1" of this object, Sally Jones is associated with an employee number of "321" and a SS Number of "123-45-6789", but is not a permanent employee. In this situation, for this implementation, a corresponding sync record would not be created in the sync table 160 when inserting this version of Sally Jones' record (versioned object), because the trigger condition of "Permanent Employee"="Y" is not met.

As may also be seen in the main table 150, versions "2" and "3" of the versioned object with an ID="2" for Sally Jones indicate that she became a permanent employee. Using the techniques described herein, when inserting each of these records in the main table 150, an insert trigger would be fired because the trigger condition of "Permanent Employee"="Y" is met. Uniqueness of the "Employee Number" and "SS Number" attributes would be evaluated, respectively, for each insertion request and, once uniqueness is confirmed, the first sync record (e.g., with "Employee Number"="125") in the sync table 160 for Sally Jones would be created with a "Record Count" of "1." In this example, when version "3" of the versioned database object for Sally Jones is entered in the main table 150, the second sync record (e.g., with "Employee Number"="127") in the sync table 160 for Sally Jones would be created with a "Record Count" of "1", because the unique attribute of versions "2" and "3" of Sally Jones' versioned database objects are not the same. Specifically, those two versions have different "Employee Numbers." Such a situation may occur, for example, if Sally were to have left the company and then returned, with a new permanent employee number being assigned on her return. Retaining each of the versioned database objects in the sync table 160 may be advantageous in order to keep a historical record for each employee.

In the example shown in FIG. 3, if the unique attributes were not allowed to change (e.g., were immutable), this could be enforced by requiring that IDs in the sync table 160 be unique. In this situation, attempting to enter version "3" of Sally Jones' database object would fail because the ID of "2" would not be unique. If an application layer made such a request, the database engine used to implement the tables of FIG. 3 may abort such a request and raise an exception to the requesting application layer.

Figure 4:
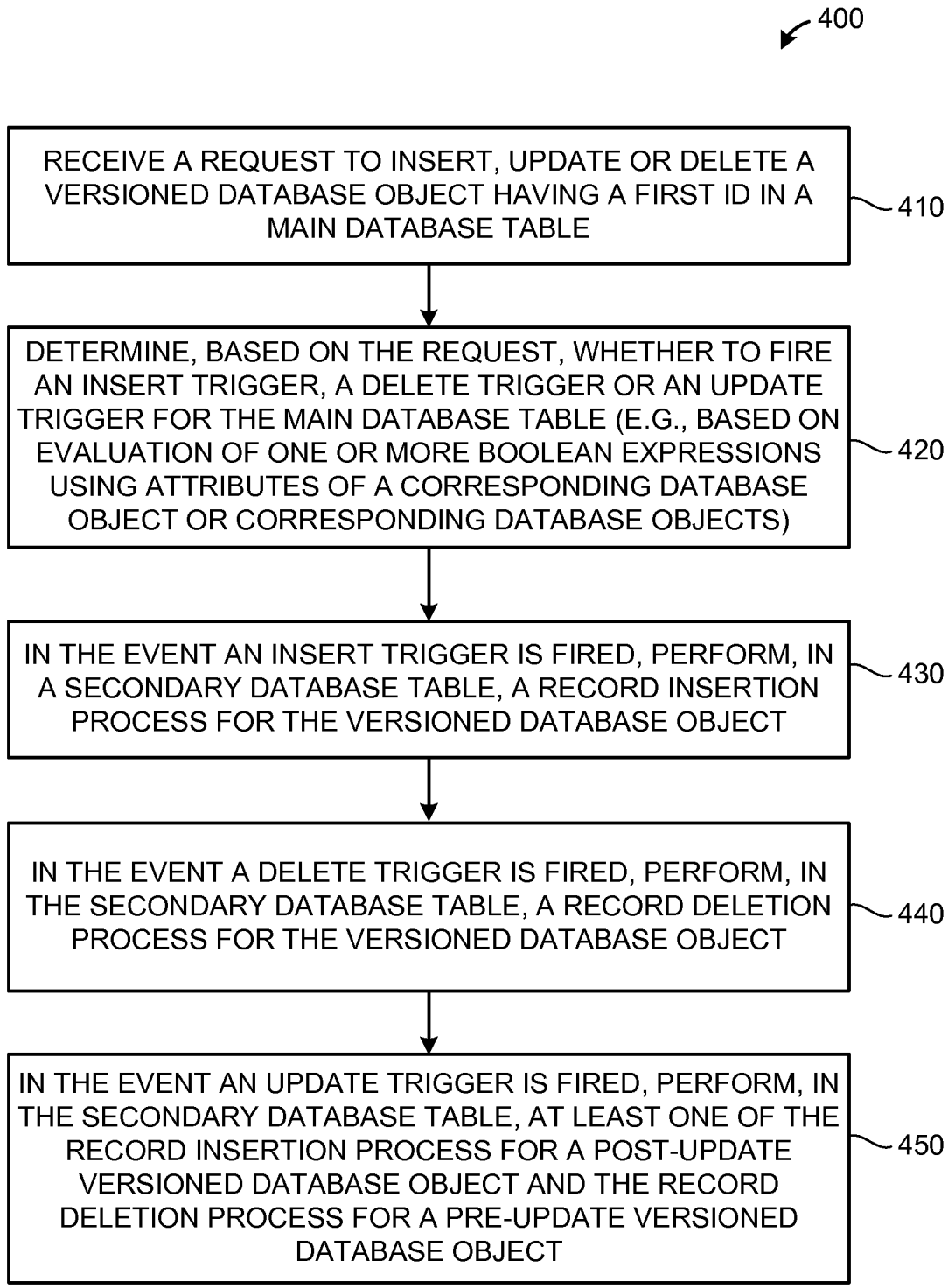
FIG. 4 is a flowchart illustrating a method for guaranteeing attribute uniqueness for versioned database object according to an example implementation.

FIG. 4 is a flowchart illustrating a method 400 for enforcing uniqueness constraints for attributes of versioned database objects according to an example implementation. The method 400 may be implemented using the approaches discussed above with respect to FIGS. 1-3. Accordingly, for purposes of illustration, the method 400 will be described with further reference to FIGS. 1-3, as appropriate. Further, the method 400 may also be implemented in conjunction with the methods illustrated in FIGS. 5-10, which are each described in order below. In FIGS. 4-10, some operations of one method may be duplicated in another method for clarity of illustration. For instance, operations for evaluating trigger conditions are repeated in each of FIGS. 4-7. Also, in some instances, also for clarity of illustration, specific method operations may not be shown. It will be appreciated that the particular operations performed by a given implementation may vary. Further, the method 400 (as well as each of the methods illustrated in FIGS. 5-10) may be implemented as computer-implemented methods by one or more-processors executing machine-readable instructions that are stored in a non-transitory, computer-readable medium.

The method 400 includes, at block 410, receiving a request to insert, update or delete a versioned database object having a first identifier (ID) in a main database table, such as a request from the application layer 130 to the database engine 140 to insert, update or delete the versioned data object 200 in the main database table 150. At block 420, the method 400 includes determining, based on the request at block 410, whether to fire an insert trigger, a delete trigger or an update trigger for the main database table, such as in fashions described herein. As described herein, the determination at block 410 may be made by evaluating one or more Boolean expressions based on trigger attributes of a corresponding versioned database object (e.g., a new versioned object, a versioned object being deleted, a pre-update versioned object and/or a post-update versioned object).

In such an approach, the application layer 130 may be operable to communicate with the database engine 140 to add, delete and/or update database records for elements of a given data network. For example, the database records for each element of the given data network may be stored in the main database table 150, or in a plurality of main database tables, where database records for each different type of network element are stored in respective, separate database tables. For instance, respective database records for each server in a given data network may be stored in a first main database table, while respective database records for each switch in a given data network may be stored in a second main database table, etc. Of course, other arrangements are possible. For purposes of clarity and brevity, only a single main database table 150 is shown in FIG. 1. It will be understood, however, depending on the particular implementation (e.g., the particular application layer 130 with which the database engine 140 is operating), that multiple main database tables 150 may be included in the database engine 140, e.g., one main database table 150 for each different type of database record that is maintained by the database engine 140.

Figure 5:
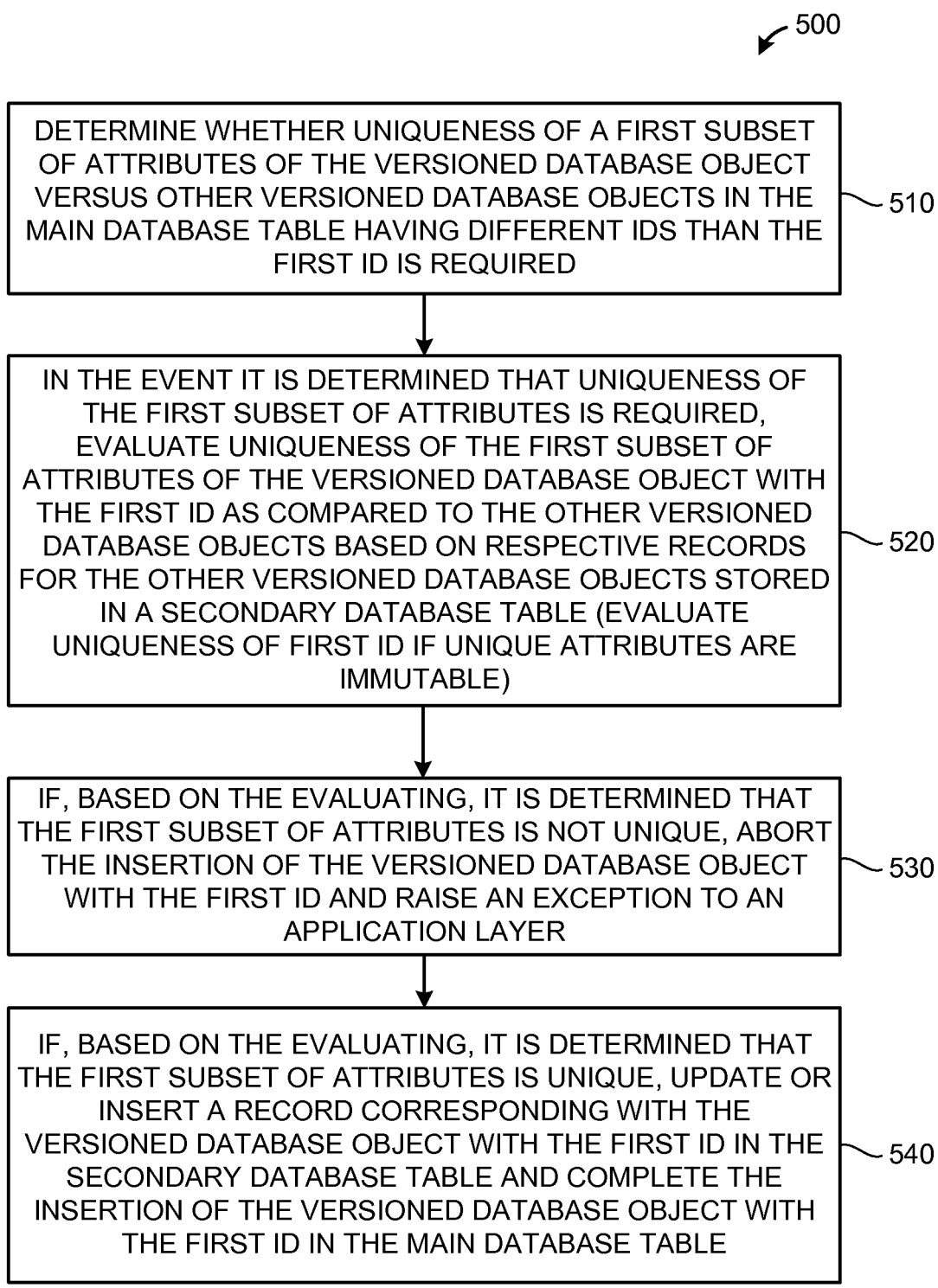
FIG. 5 is a flowchart illustrating a method for inserting a versioned database object in a database table according to an example implementation.

FIG. 5 is a flowchart illustrating a method 500 for inserting a versioned database object in a database table according to an example implementation. As with the method 400, the method 500 may be implemented using the approaches discussed above with respect to FIGS. 1-3 and in conjunction with the method of, at least, FIG. 4. Accordingly, for purposes of illustration, the method 500 will also be described with further reference to FIGS. 1-4, as appropriate.

The method 500, at block 510, includes, in response to receiving a request to insert a versioned database object with a first ID in a main database table, such as at block 410, determining whether uniqueness of a first subset of attributes of the versioned database object versus other versioned database objects in the main database table having different IDs than the first ID is required, or is to be enforced. For instance, the determination at block 510 may include evaluating insert trigger conditions using trigger attributes, such as in the fashions described herein (e.g., evaluating a Boolean expression based on the trigger attributes 180).

In the event that the trigger conditions are met at block 510, and uniqueness constraints are to be enforced, the method 500 includes, at block 520, evaluating uniqueness of the first subset of attributes of the versioned database object with the first ID (e.g., the versioned object that was requested to be inserted in the main table 150) as compared to the other versioned database objects based on respective records for the other versioned database objects (with different IDs) stored in a secondary database table (e.g., the sync table 160). For instance, unique attributes of the versioned database object being inserted may be compared to corresponding unique attributes for versioned database objects with other IDs that are stored in the sync table 160. If the unique attributes in the main database table 150 are being enforces as being immutable, uniqueness of the ID of versioned object being that has been requested to the insert may also be evaluated in the sync table 160 at block 520.

If, based on the evaluating at block 520, it is determined that the first subset of attributes is not unique, the method 500 further includes, at block 530 aborting the insertion of the versioned database object with the first ID and raising an exception to an application layer, such as the application layer 130. The method 500 may also include, at block 530, removing a temporary row in the main database table 150 (or elsewhere in the database engine 140) that includes the attributes of the versioned object that was requested to be inserted.

Figure 8:
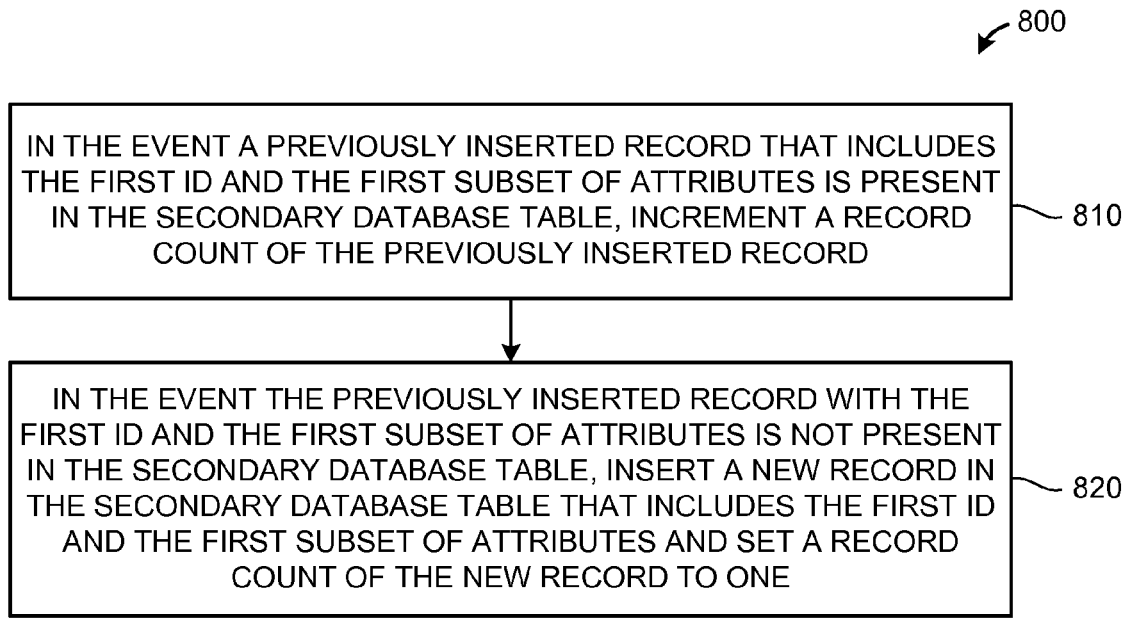
FIG. 8 is a flowchart illustrating a method for updating and/or inserting a sync table record for a corresponding versioned database object in a database table according to an example implementation.

If, based on the evaluating at block 520, it is determined that the first subset of attributes (the unique attributes) is unique, the method 500 may further include, at block 540 updating (e.g., incrementing a record count) or inserting a new record corresponding with the versioned database object with the first ID in the secondary database table (with a record count of 1), such as in accordance with the method 800 illustrated in FIG. 8. The method 500 may also include, at block 540, completing the requested insertion of the versioned database object with the first ID in the main database table.

Figure 6:
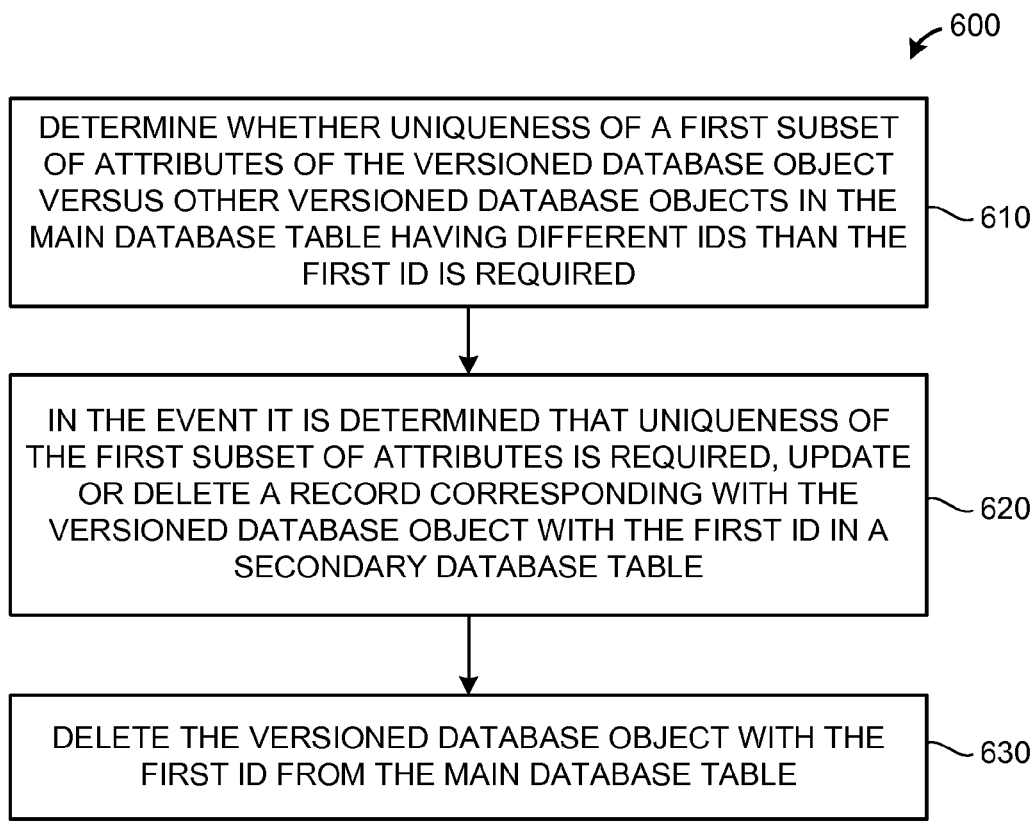
FIG. 6 is a flowchart illustrating a method for deleting a versioned database object in a database table according to an example implementation.

FIG. 6 is a flowchart illustrating a method 600 for deleting a versioned database object in a database table according to an example implementation. As with the methods 400 and 500, the method 600 may be implemented using the approaches discussed above with respect to FIGS. 1-3 and in conjunction with the method of, at least, FIG. 4. Accordingly, for purposes of illustration, the method 600 will also be described with further reference to FIGS. 1-4, as appropriate.

The method 600, at block 610, includes, in response to receiving a request to delete a versioned database object with a first ID from a main database table, such as at block 410, determining whether uniqueness of a first subset of attributes of the versioned database object versus other versioned database objects in the main database table having different IDs than the first ID is required, or is to be enforced. In the event it is determined, at block 610, that uniqueness of the first subset of attributes is required, the method 600 includes, at block 620, updating or deleting a record corresponding with the versioned database object with the first ID in a secondary database table, such as in accordance with the method 900 illustrated in FIG. 9. At block 630, the method 600 may further include deleting the versioned database object with the first ID from the main database table.

Figure 7:
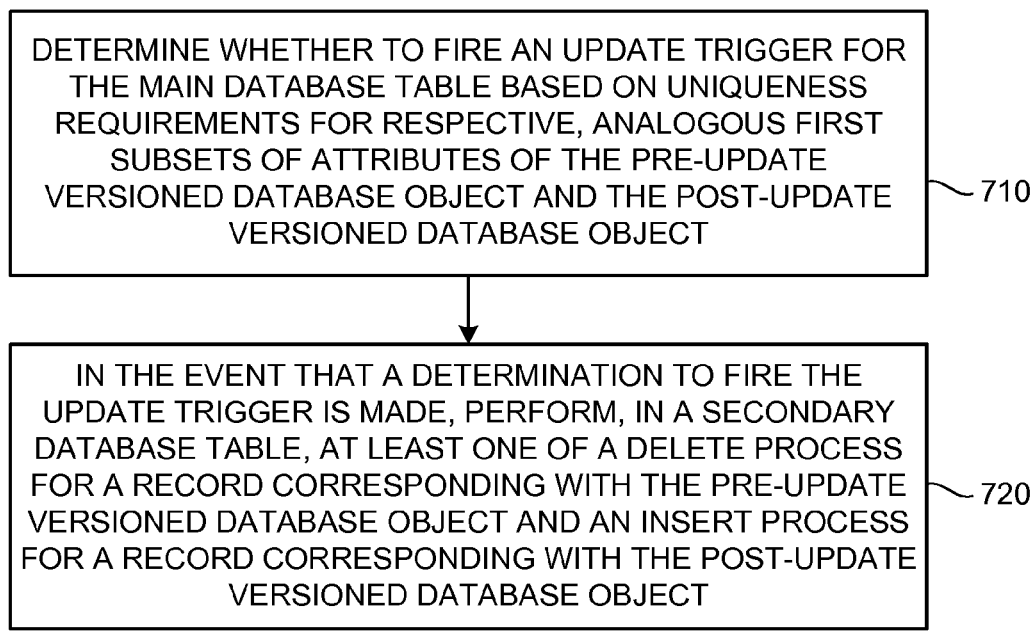
FIG. 7 is a flowchart illustrating a method for updating a versioned database object in a database table according to an example implementation.

FIG. 7 is a flowchart illustrating a method 700 for updating a versioned database object in a database table (e.g., the main table 150) according to an example implementation. As with the methods 400, 500 and 600, the method 700 may be implemented using the approaches discussed above with respect to FIGS. 1-3 and in conjunction with the method of, at least, FIG. 4. Accordingly, for purposes of illustration, the method 700 will also be described with further reference to FIGS. 1-4, as appropriate.

The method 700, at block 710, includes, in response to receiving a request to update a versioned database object with a first ID in a main database table from a pre-update versioned database object to a post-update versioned database object, such as at block 410, determining whether to fire an update trigger for the main database table. In the method 700, determining whether to fire the update trigger may be determined based on uniqueness requirements for respective, analogous first subsets of attributes of the pre-update versioned database object and the post-update versioned database object, such as in accordance with the method 1000 illustrated in FIG. 10 and described below. Briefly, however, the uniqueness requirements may be determined based on trigger attributes of the pre-update and post-update versioned database object, as well as the unique attributes of the pre-update and post-update versioned database object.

At block 720, in the event that a determination to fire the update trigger is made, the method 700 includes performing, in a secondary database table (e.g., the sync table 160), at least one of a delete process for a record corresponding with the pre-update versioned database object (e.g., in accordance with the method 900 of FIG. 9) and an insert process for a record corresponding with the post-update versioned database object (e.g., in accordance with the method 800 of FIG. 8).

FIG. 8 is a flowchart illustrating a method 800 for updating and/or inserting a sync table record for a corresponding versioned database object in a main database table according to an example implementation. As with the methods 400-700, the method 800 may be implemented using the approaches discussed above with respect to FIGS. 1-3. Accordingly, for purposes of illustration, the method 800 will also be described with further reference to FIG. 3, as appropriate. Further, the method 800 may also be implemented in conjunction with the methods of, at least, FIGS. 5 and 7.

In the event a previously inserted record that includes the first ID and the first subset of attributes is present in the secondary database table 160 (e.g., such as discussed with respect to the records for Dave Smith in the sync table 160 of FIG. 3), the method 800 may include, at block 810, incrementing a record count of the previously inserted record. In the event the previously inserted record with the first ID and the first subset of attributes is not present in the secondary database table 160 (e.g., such as discussed with respect to the records for Sally Jones in the sync table 160 of FIG. 3), the method 800 may include, at block 820, inserting a new record in the secondary database table that includes the first ID and the first subset of attributes, where a record count of the new record is set to "1."

Figure 9:
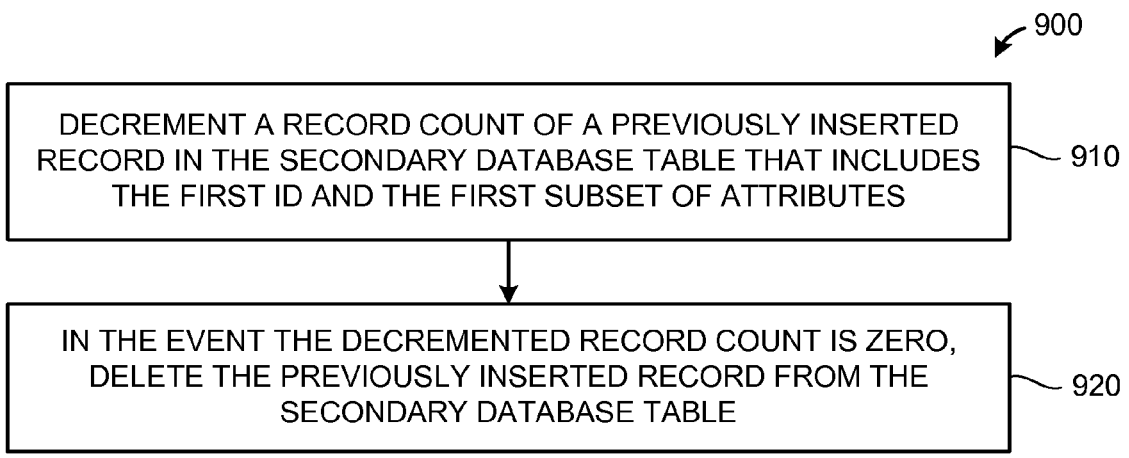
FIG. 9 is a flowchart illustrating a method for updating and/or deleting a sync table record for a corresponding versioned database object in a database table according to an example implementation.

FIG. 9 is a flowchart illustrating a method 900 for updating and/or deleting a sync table record for a corresponding versioned database object in a main database table according to an example implementation. As with the methods 400-800, the method 900 may be implemented using the approaches discussed above with respect to FIGS. 1-3. Further, the method 900 may also be implemented in conjunction with the methods of, at least, FIGS. 6 and 7.

At block 910, in response to a request to delete a sync table record, such as in connection with deleting or updating a versioned database object in a main database table, the method 900 includes decrementing a record count of a previously inserted record in the secondary database table (e.g., the sync table 160) that includes the first ID and the first subset of attributes. In the event the decremented record count is zero, the method 900 includes, at block 920, deleting the previously inserted record from the secondary database table.

If the comparison of the unique attributes 212 with the sync records 240 indicates that the unique attributes 212 violate uniqueness constraints (e.g., are not unique across versioned objects with different IDs), the database engine 140 may abort the insert operation, remove the temporary row from the main table 150 and raise an exception to the application layer 130, indicating that the insert request failed. However, if the comparison of the unique attributes 212 with the sync records 240 indicates that the unique attributes 212 of the object 200 do not violate uniqueness constraints (e.g., are unique across versioned objects with different IDs), the database engine 140 may then insert the sync record 230 in the sync table 160, where the sync record 230 includes the ID 202, and a record_count 232 (e.g., where the record-count 232 is set to one if the sync record 230 is new).

Figure 10:
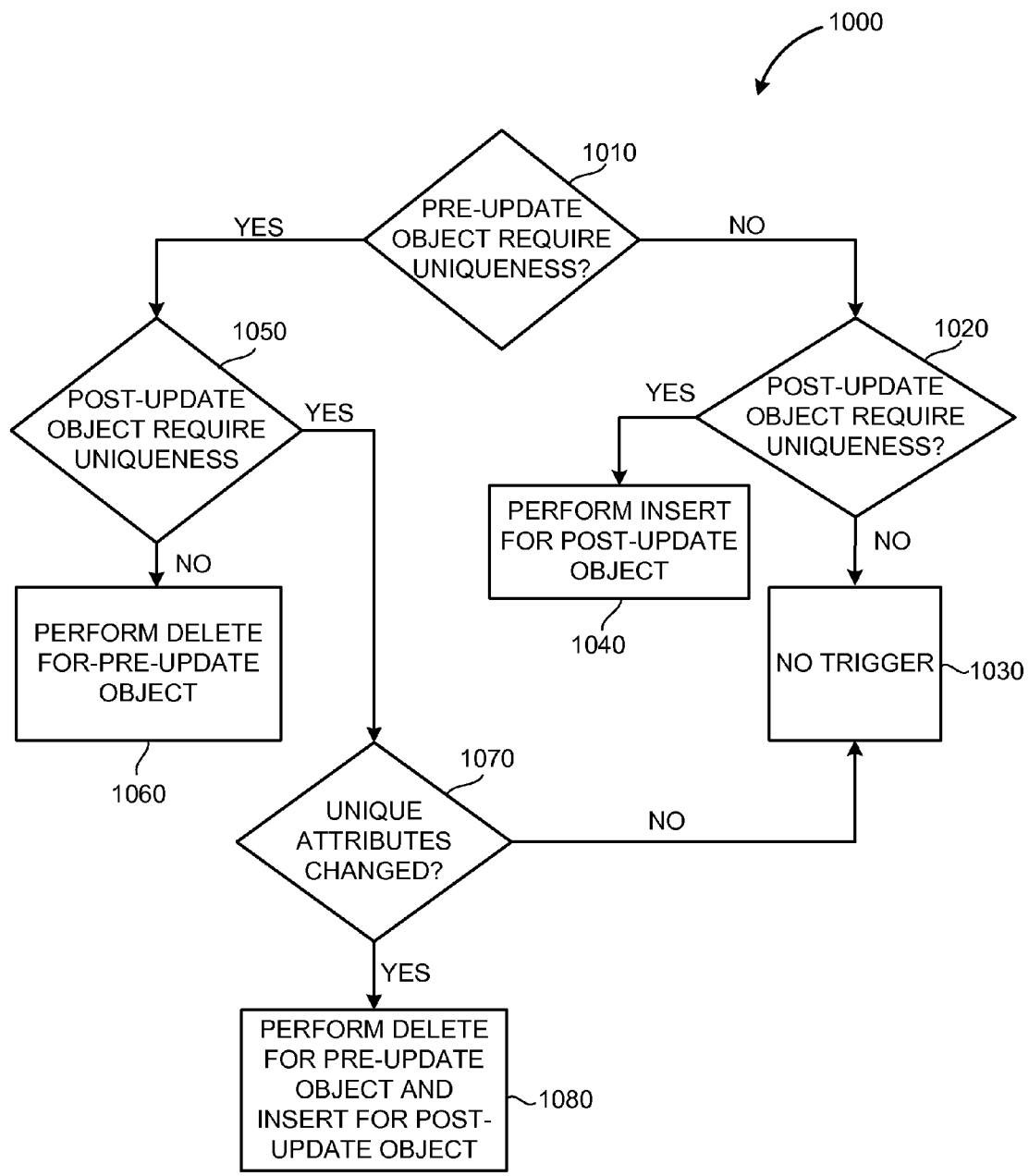
FIG. 10 is a flowchart illustrating a method for determining whether an update trigger should be fired and what actions should be performed in response to the update trigger according to an example implementation.

As shown in FIG. 10, the method 1000, at block 1010, may include determining whether uniqueness constraints were enforced for the pre-update versioned object. The determination at block 1010 may be made by evaluating trigger conditions (e.g., based on trigger values) for the pre-update versioned object). If it is determined at block 1010 that uniqueness constraints were not enforced for the pre-update versioned object the method 1000 may proceed to block 1020. The method 1000, at block 1020, may include determining whether uniqueness constraints are to be evaluated for the post-update versioned object. The determination at block 1020 may be made by evaluating trigger conditions (e.g., based on trigger values) for the post-update versioned object.

If it is determined at block 1020 that uniqueness constraints are to be enforced for the post-update versioned object, the method 1000 may proceed to block 1040, an update trigger may fire and the insert process of the method 800 may be performed for the post-update versioned object. If, however, it is determined at block 1020 that uniqueness constraints are not being forced for the post-update versioned object, the method 1000 may proceed to block 1030 and no update trigger may be fired.

Returning to block 1010, if it is determined that uniqueness constraints were enforced for the pre-update versioned object, the method 1000 may proceed to block 1050 where it is determined whether uniqueness constraints are to be enforced for the post-update versioned object. In like fashion as the determination made at block 1020, the determination at block 1050 may be made by evaluating trigger conditions (e.g., based on trigger values) for the post-update versioned object. If it is determined at block 1050 that uniqueness constraints are not to be performed to be performed for the post-update versioned object, the method 1000 may proceed to block 1060, an update trigger may fire and the delete process of the method 900 may be implemented for the pre-update versioned object.

If it is determined at block 1050 that uniqueness constraints are to be enforced for the post-update versioned object the method 1000 may proceed to block 1070, where it may be determined if the unique attributes of the versioned object have changed between the pre-update versioned object and the post-update versioned object. If it is determined at block 1070 that the unique attributes have not changed between the pre-update versioned object in the post-update versioned object the method 1000 may proceed, again, to block 1030 and no update trigger may be fired.

If, based on evaluating the trigger conditions 180 for the update request, an update trigger is fired, the database engine 140 may perform one or both of a delete process for the pre-update object and/or an insert process for the post-update object, such as in similar fashions as described above and are described further below. For instance, FIG. 10, which is described below, illustrates an example method that may be implemented to evaluate update request trigger conditions and to determine what operations to perform in response to a given update request. Of course, other approaches are possible. For instance, an update trigger may be fired by the database engine 140 for every update request that is received from the application layer 130 and separate trigger conditions 180 may be evaluated to determine which, if any, operations to perform in response to a given update trigger.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method including executing, using at least one processor, instructions recorded on a non-transitory computer-readable storage medium, the method comprising:
   receiving a request to insert, in a main database table, a versioned database object having a first identifier (ID) and including a plurality of attributes;
   determining whether uniqueness of a first subset of the plurality of attributes of the versioned database object having the first ID as compared to analogous attributes included in other versioned database objects in the main database table having different IDs than the first ID is required; and
   based on determining that uniqueness of the first subset of attributes is required, evaluating uniqueness of the first subset of attributes of the versioned database object with the first ID as compared to the analogous attributes of the other versioned database objects based on respective records for the other versioned database objects stored in a secondary database table, wherein the secondary database table includes a plurality of records for versioned database objects, each record associated with a respective record count indicative of a number of records of the versioned database object included in the main database.

2. The computer-implemented method of claim 1, wherein based on determining that the first subset of attributes is not unique, the method further comprises:
   aborting the insertion of the versioned database object with the first ID; and
   raising an exception to an application layer.

3. The computer-implemented method of claim 1, wherein based on determining that the first subset of attributes is unique, the method further comprises:
   determining whether a record for the versioned database object having the first ID is included in the secondary database table; and
   based on determining that a record for the versioned database object having the first ID is not included in the secondary database table, the method further comprises:
      inserting a record corresponding with the versioned database object with the first ID in the secondary database table; and
   based on determining that a record for the versioned database object having the first ID is included in the secondary database table, the method further comprises:
      updating a respective record count for the record corresponding with the versioned database object with the first ID in the secondary database table; and
   completing the insertion of the versioned database object with the first ID in the main database table.

4. The computer-implemented method of claim 3, wherein the record for the versioned database object having the first ID included in the secondary database table includes the first ID and the first subset of attributes; and
   wherein updating the respective record count for the record corresponding with the versioned database object with the first ID comprises incrementing the respective record count.

5. The computer-implemented method of claim 3, further comprising setting a respective record count of the inserted record to one.

6. The computer-implemented method of claim 1, wherein determining whether uniqueness of the first subset of attributes is to be evaluated is based on a second subset of the plurality of attributes of the versioned database object with the first ID.

7. The computer-implemented method of claim 1, wherein determining whether uniqueness of the first subset of attributes is required comprises evaluating a Boolean expression based on a second subset of the plurality of attributes of the versioned database object with the first ID.

8. The computer-implemented method of claim 1, wherein evaluating uniqueness of the first subset of attributes of the versioned database object with the first ID includes evaluating uniqueness of the first ID in the secondary database table.

9. A computer-implemented method including executing, using at least one processor, instructions recorded on a non-transitory computer-readable storage medium, the method comprising:
   receiving a request to delete, from a main database table, a versioned database object having a first identifier (ID) and including a plurality of attributes;
   determining whether uniqueness of a first subset of the plurality of attributes of the versioned database object having the first ID as compared to analogous attributes included in other versioned database objects in the main database table having different IDs than the first ID is required; and
   based on determining that uniqueness of the first subset of attributes is required, updating or deleting a record corresponding with the versioned database object with the first ID in a secondary database table, wherein the record is associated with a respective record count indicative of a number of records of the versioned database object with the first ID that are included in the main database.

10. The computer-implemented method of claim 9, wherein determining whether uniqueness of the first subset of attributes of the versioned database object with the first ID is required comprises evaluating a Boolean expression based on a second subset of the plurality of attributes of the versioned database object with the first ID.

11. The computer-implemented method of claim 9, wherein updating or deleting a record corresponding with the versioned database object with the first ID in the secondary database table comprises:
   decrementing a respective record count of a previously inserted record in the secondary database table that includes the first ID and the first subset of attributes; and
   in the event the decremented respective record count is zero, deleting the previously inserted record from the secondary database table.

12. The computer-implemented method of claim 9, further comprising deleting the versioned database object with the first ID from the main database table.

13. A computer-implemented method including executing, using at least one processor, instructions recorded on a non-transitory computer-readable storage medium, the method comprising:
   receiving a request to update, in a main database table, a versioned database object having a first identifier (ID) from a pre-update versioned database object to a post-update versioned database object;
   determining whether to fire an update trigger for the main database table based on uniqueness requirements for respective, analogous first subsets of attributes of the pre-update versioned database object and the post-update versioned database object, and based on evaluating trigger criteria for respective, analogous second subsets of attributes of the pre-update versioned database object and the post-update versioned database object; and
   in the event that a determination to fire the update trigger is made, performing, in a secondary database table, at least one of:
      a delete process for a record corresponding with the pre-update versioned database object; and
      an insert process for a record corresponding with the post-update versioned database object.

14. The computer-implemented method of claim 13, wherein determining whether to fire the update trigger comprises evaluating one or more Boolean expressions based on the respective, analogous second subsets of attributes of the post-update versioned database object and the pre-update versioned database object.

15. The computer-implemented method of claim 14, wherein evaluating the one or more Boolean expressions comprises:
   determining that uniqueness of the first subset of attributes for the post-update versioned database object is not to be evaluated; and
   determining that uniqueness of the first subset of attributes for the pre-update versioned database object was evaluated,
   wherein, in response, the method comprises performing the delete process including:
      decrementing a record count of a previously inserted record in the secondary database table that includes the first ID and the first subset of attributes of the pre-update versioned database object; and
      in the event the decremented record count is zero, deleting the previously inserted record from the secondary database table.

16. The computer-implemented method of claim 14, wherein evaluating the one or more Boolean expressions comprises determining that:
   uniqueness of the first subset of attributes for the post-update versioned database object is to be evaluated;
   uniqueness of the first subset of attributes for the pre-update versioned database object was evaluated; and
   the first subset of attributes of the post-update versioned database object is different than the first subset of attributes of the pre-update versioned database object,
   wherein, in response, the method comprises:
      performing the delete process including:
         decrementing a record count of a previously inserted record in the secondary database table that includes the first ID and the first subset of attributes of the pre-update versioned database object; and
         in the event the decremented record count is zero, deleting the previously inserted record from the secondary database table; and
      performing the insert process including:
         evaluating uniqueness of the first subset of attributes of the post-update versioned database object as compared to other versioned database objects in the main database table having respective IDs that are different than the first ID, the evaluating being based on respective records for the other versioned database objects stored in the secondary database table;
         based on determining that the first subset of attributes of the post-update versioned database object are not unique:
            aborting the update; and
            raising an exception in an application layer; and
         based on determining that the first subset of attributes of the post-update versioned database object are unique:
            updating or inserting a record corresponding with the post-update versioned database object in the secondary database table; and
            completing the update of the versioned database object with the first ID in the main database table.

17. The computer-implemented method of claim 16, wherein evaluating uniqueness of the first subset of attributes of the post-update versioned database object includes evaluating uniqueness of the first ID in the secondary database table.

18. The computer-implemented method of claim 16, wherein updating or inserting a record in the secondary database table corresponding with the post-update versioned database object comprises:
   in the event a previously inserted record that includes the first ID and the first subset of attributes of the post-update version of the versioned database object is present in the secondary database table, incrementing a record count of the previously inserted record; and
   in the event the previously inserted record with the first ID and the first subset of attributes is of the post-update versioned database object is not present in the secondary database table, inserting a new record in the secondary database table that includes the first ID and the first subset of attributes of the post-update versioned database object.

19. The computer-implemented method of claim 18, further comprising setting a record count of the new record to one.

20. The computer-implemented method of claim 14, wherein evaluating the one or more Boolean expressions comprises determining that:
- uniqueness of the first subset of attributes for the post-update versioned database object is to be evaluated; and
- uniqueness of the first subset of attributes for the pre-update versioned database object was not evaluated, wherein, in response, the method comprises performing the insert process including:
- evaluating uniqueness of the first subset of attributes of the post-update versioned database object as compared to other versioned database objects in the main database table having respective IDs that are different than the first ID, the evaluating being based on respective records for the other versioned database objects stored in the secondary database table;
- based on determining that the first subset of attributes of the post-update versioned database object is not unique:
  - aborting the update; and
  - raising an exception in an application layer; and
- based on determining that the first subset of attributes of the post-update versioned database object is unique:
  - updating or inserting a record corresponding with the post-update versioned database object in the secondary database table; and
  - completing the update of the versioned database object with the first ID in the main database table.

21. The computer-implemented method of claim 20, wherein evaluating uniqueness of the first subset of attributes of the post-update versioned database object includes evaluating uniqueness of the first ID in the secondary database table.

22. The computer-implemented method of claim 20, wherein updating or inserting a record in the secondary database table corresponding with the post-update versioned database object comprises:
- in the event a previously inserted record that includes the first ID and the first subset of attributes of the post-update version of the versioned database object is present in the secondary database table, incrementing a record count of the previously inserted record; and
- in the event the previously inserted record with the first ID and the first subset of attributes is of the post-update versioned database object is not present in the secondary database table, inserting a new record in the secondary database table that includes the first ID and the first subset of attributes of the post-update versioned database object.

23. The computer-implemented method of claim 22, further comprising setting a record count of the new record to one.

24. A computer-implemented method including executing, using at least one processor, instructions recorded on a non-transitory computer-readable storage medium, the method comprising:
- receiving a request to insert, update or delete a versioned database object having a first identifier (ID) in a main database table and including a plurality of attributes;
- determining, based on the request and based on evaluating trigger criteria for a subset of the plurality of attributes, whether to fire an insert trigger, a delete trigger or an update trigger for the main database table;
- in the event an insert trigger is fired, performing, in a secondary database table, a record insertion process for the versioned database object;
- in the event a delete trigger is fired, performing, in the secondary database table, a record deletion process for the versioned database object; and
- in the event an update trigger is fired, performing, in the secondary database table, at least one of:
  - the record insertion process for a post-update versioned database object; and
  - the record deletion process for a pre-update versioned database object.

25. A non-transitory computer-readable storage medium having instructions stored thereon that, when executed by one or more processors, cause a computing device to:
- receive a request to insert, update or delete a versioned database object having a first identifier (ID) in a main database table and including a plurality of attributes;
- determine, based on the request and based on evaluating trigger criteria for a subset of the plurality of attributes, whether to fire an insert trigger, a delete trigger or an update trigger for the main database table;
- in the event an insert trigger is fired, perform, in a secondary database table, a record insertion process for the versioned database object;
- in the event a delete trigger is fired, perform, in the secondary database table, a record deletion process for the versioned database object; and
- in the event an update trigger is fired, perform, in the secondary database table, at least one of:
  - the record insertion process for a post-update versioned database object; and
  - the record deletion process for a pre-update versioned database object.

* * * * *